United States Patent [19]

Matsumoto

[11] 4,196,794
[45] Apr. 8, 1980

[54] RETAINING PLATE FOR BRAKE PADS

[75] Inventor: Atsuo Matsumoto, Itami, Japan

[73] Assignee: Sumitomo Electric Industries, Ltd., Osaka, Japan

[21] Appl. No.: 23,990

[22] Filed: Mar. 26, 1979

[30] Foreign Application Priority Data

Mar. 28, 1978 [JP] Japan .................................. 53-36273

[51] Int. Cl.² .............................................. F16D 55/22
[52] U.S. Cl. ..................................... 188/73.5; 188/72.3
[58] Field of Search ..................... 188/72.3, 72.4, 73.5, 188/205 A, 216

[56] References Cited

U.S. PATENT DOCUMENTS

| | | | |
|---|---|---|---|
| 3,294,205 | 12/1966 | Schanz | 188/205 A |
| 3,500,966 | 3/1970 | Birge | 188/216 |
| 3,612,226 | 10/1971 | Pauwels et al. | 188/205 A |
| 4,134,477 | 1/1979 | Asquith | 188/73.5 |

FOREIGN PATENT DOCUMENTS 2711729  9/1977  Fed. Rep. of Germany ......... 188/73.5

*Primary Examiner*—Edward R. Kazenske
*Attorney, Agent, or Firm*—Sughrue, Rothwell, Mion, Zinn and Macpeak

[57] ABSTRACT

A retaining plate for brake pads with recesses that extend from both ends of a plate-shaped body in the longitudinal direction thereof. A pair of arms are bent backward at the front edge of the body with the end portions of the pair of arms bent downwardly. A pair of depressing sections are bent at the rear edge of the body in such a manner that the depressing sections are inclined inwardly with respect to the front edge of the body.

5 Claims, 5 Drawing Figures

RETAINING PLATE FOR BRAKE PADS

BACKGROUND OF THE INVENTION

This invention relates to a plate-shaped member capable of retaining brake pads and detecting the wear of the brake pads.

A method in which brake pad backing plates are depressed against a stationary member (torque member) in one direction by spring means to prevent the generation of rattle sounds, etc. is well known in the art.

However, it is difficult to effectively prevent the generation of the abnormal sound merely by applying a depressing force to the pad backing plates in the circumferential direction. If the application of depressing forces is intended in several directions by means of only one spring, then the construction necessarily becomes intricate.

On the other hand, a method in which a probe is inserted into a brake pad to its wear limit and to electrically detect the wear of the brake pad is extensively employed. However, this method is disadvantageous in that the probe mounting construction is relatively intricate and a detection circuit must be provided. Therefore the number of factors potentially causing trouble is increased as is the manufacturing cost.

SUMMARY OF THE INVENTION

Accordingly, an object of this invention is to provide a retaining plate for brake pads, which is simple in construction and yet capable of effectively preventing the generation of abnormal sound in the brake pads.

It is another object of this invention to provide a brake pad retaining plate which can detect when brake pads are worn out to the wear limit.

These and other objects of this invention are accomplished in a retaining pad for brake pads having recesses extending from both ends of a plate-shaped body in the longitudinal direction. A pair of arms are bent backward at the front edge of the body. The end portions of the pair of arms are bent downward and a pair depressing sections are bent at the rear edge of the body in such a manner that the depressing sections are inclined inwardly with respect to the front edge of the body.

This invention will be explained with respect to the accompanying drawings and the description of the preferred embodiment that follows.

DESCRIPTION OF THE PREFERRED EMBODIMENT

Figure 1:
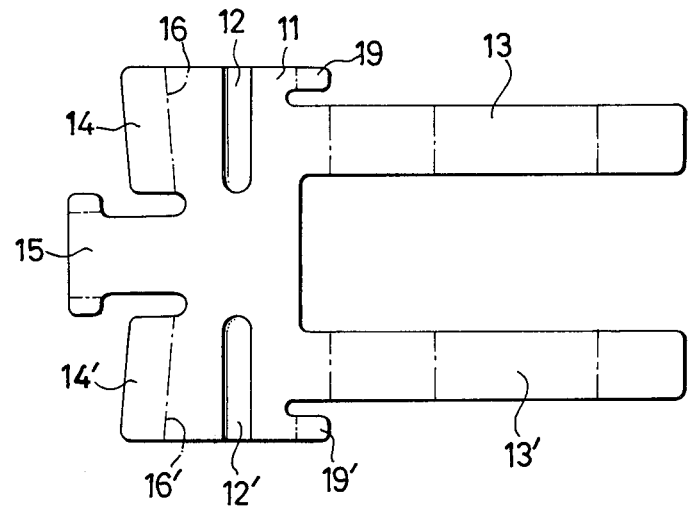
FIG. 1 is an unfolded view of a retaining plate according to this invention.

One example of the retaining plate according to the invention will now be described with reference to the accompanying drawings:

The retaining plate according to the invention is obtained by stamping a spring steel plate as shown in FIG. 1 and bending it as required.

As shown in FIG. 1, recesses 12 and 12' extend from both ends of a substantially rectangular body 11 in the longitudinal direction. A pair of arms 13 and 13' extend from the front edge thereof. Depressing sections 14 and 14' are provided at the sides of the rectangular body 11 opposite to the arms. A locking section 15 is formed between the depressing sections 14 and 14'.

Figure 3:
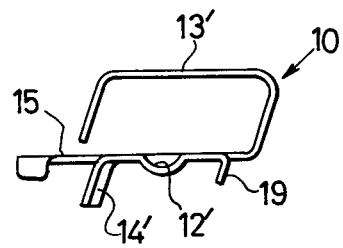
FIG. 3 is a side view of the retaining plate shown in FIG. 2.
Figure 2:
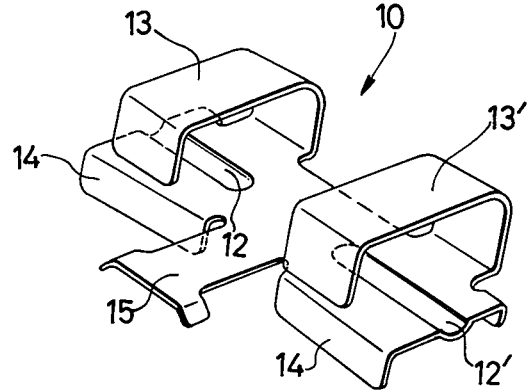
FIG. 2 is a perspective view of the retaining plate bent as required.

The plate thus shaped is bent along the chain lines in FIG. 1 to provide the retaining plate 10 as shown in FIGS. 2 and 3. More specifically, as shown in FIGS. 2 and 3, the arms 13 and 13' are bent backward at the front edge of the plate body 11 and the end portions thereof are bent downward. On the other hand, the depressing sections 14 and 14' are bent along the lines 16 and 16' on the rear edge which are oblique, inwardly with respect to the front edge of the plate body 11, respectively. A pair of flanges 19 and 19' are formed downwardly along the front edge of the plate body.

Figure 4:
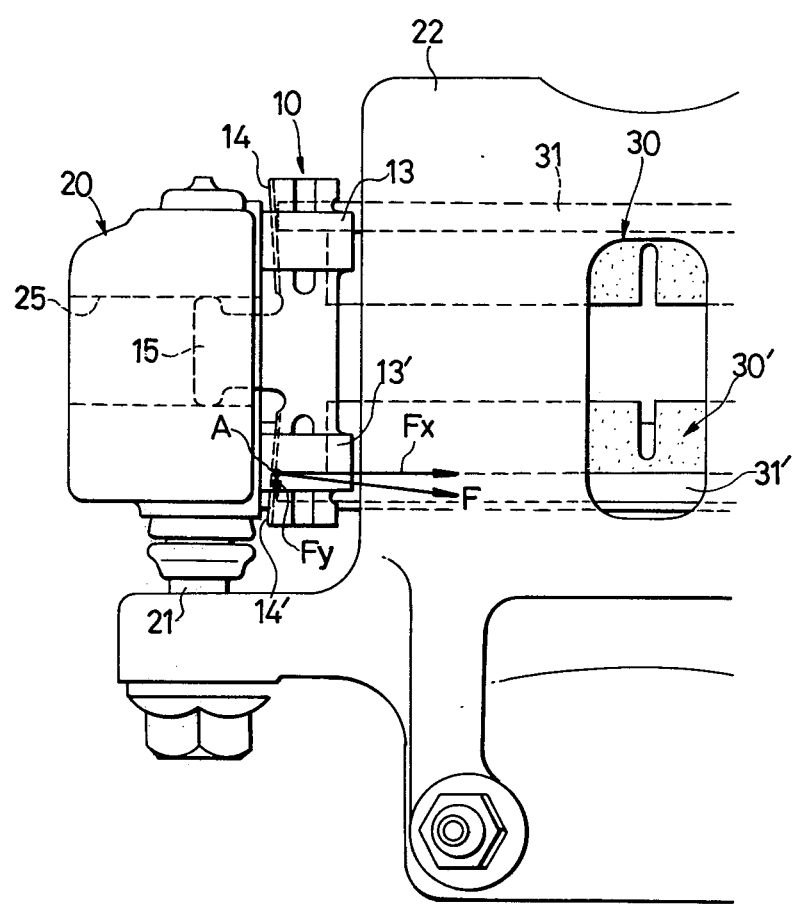
FIG. 4 is a plan view of one example of a disk brake in which the retaining plate according to the invention is mounted.
Figure 5:
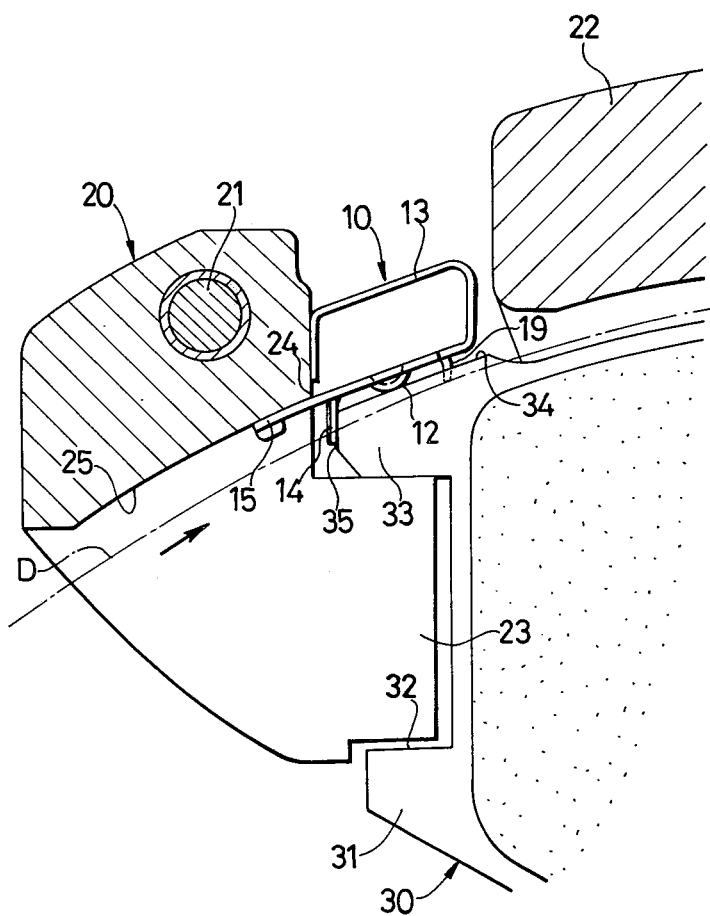
FIG. 5 is a vertical sectional view of the disk brake shown in FIG. 4.

Shown in FIGS. 4 and 5 is one example of a disk brake in which the retaining plate 10 according to the invention is mounted.

As illustrated, pins 21 are slidably inserted into both sides (only one side shown) of a stationary member (torque member) 20. A floating caliper 22 is supported by the pin. Brake pads 30 and 30' confront each other in the caliper.

Recesses 32 (FIG. 5) are formed in both sides (only one side shown) of one pad backing plate 13. The recess 32 is slidably engaged with a protrusion 23 provided on the inner side of the stationary member 20, to support the pad 30 or to prevent the pad 30 from coming off.

The other pad backing plate 31 is similarly supported by the stationary member 20.

The retaining plate 10 according to the invention is mounted between the ears 33 and 33' of the backing plates 31 and 31' and the jaw 24 of the stationary member 20. More specifically, the stationary member 20 has a recess 25 at the central portion thereof to permit a disk D to pass therethrough. The locking section 15 of the retaining plate 10 is inserted into recess 25, the surfaces of the end portions of the arms 13 and 13' abut against the front surface of the jaw 24, the recesses 12 and 12' abut against the inclined surfaces 34 and 34' of the ears 34 and 34', and the depressing sections 14 and 14' abut against the side surfaces 35 and 35' of the ears 33 and 33', respectively. As a result of the installation of the retaining plate 10 in this manner, the outer surfaces of the recesses 12 and 12' and the depressing plate 14 and 14' apply depressing forces to the backing plates 31 and 31', respectively.

Since the depressing sections 14 and 14' are inclined inwardly, the depressing sections 14 and 14' are in contact with the points A of the backing plates 31 and 31'. Depressing forces F are applied to the backing plates. The force F can be divided into a force component Fx in the circumferential direction of the disk D and a force component Fy in the axial direction. The force component Fx causes the pad backing plate 31 to abut against the opposite surface of the stationary member 20, thereby preventing the generation of rattle or cranky sounds. The force component Fy depresses the pads 30 and 30' in the direction in which they are displaced from the disk D, to prevent the generation of a squeak like sound, caused when the pads are dragged by the disk during the period in which no brake pressure is applied.

Furthermore, the outer surfaces (protruding toward the inclined surfaces 34 and 34') of the recesses 12 and 12', which abut against the inclined surfaces 34 and 34', of the ears 33 and 33' to depress the backing plates 31 and 31' in the radial direction of the disk D. Hence, the generation of a rattle like sound is more effectively prevented.

When the thickness of each of the pads 30 and 30' reach a predetermined wear limit, the recesses 12 and 12' and the depressing sections 14 and 14' are disengaged from the respective backing plates 31 and 31'. Accordingly, the depressing force of the retaining plate 10 applied to the backing plates is eliminated. As a result, the backing plates and the retaining plate 10 play to generate abnormal sounds which inform the operator that the pads have been worn to the wear limit. In this case, the retaining plate 10 never comes off the disk brake because the locking section 15 and the arms 13 and 13' are surrounded by the disk D, the stationary member 20 and the side wall of the caliper 22. Hence, although the generation of noise serves as a wear indicator, the operation of the brake is not impaired.

With the above description, it has been shown that according to this invention, the generation of rattles abnormal sounds such as rubbing and squeaks can be prevented during the normal ordinary period of use, but the fact that the pads have reached a predetermined wear limit is mechanically detected. This detection results in a sound indicative of this limit being reached. Therefore, the use of the retaining plate according to the invention provides a positive brake pad wear detection technique which is trouble free and easier to use.

Futhermore, since the retaining plate can be manufactured merely by stamping a spring steel plate and bending it, the retaining plate according to the invention is advantageous in terms of low manufacturing cost.

It is apparent that modifications of this invention can be made without departing from the essential scope of the invention.

What is claimed is:

1. A retaining and retracting spring plate for disc brake pads supported on opposite sides of a disc, comprising, a plate-shaped body, a pair of recessed portions formed in said body and extending from both ends of said plate-shaped body in the longitudinal direction thereof for engagement with an upper edge of said brake pads, a pair of arms bent backward at the front edge of said body, the end portions of said pair of arms bent downwardly toward said body, said arms resiliently urging said recessed portions into said engagement with said brake pads to resiliently retain said brake pads radially and circumferentially relative to a support member for said pads, and a pair of depressing sections bent downwardly away from said body at the rear edge of said body, each said depressing section being bent along a line which is obliquely inclined inwardly from the lateral edge of said body toward the center of said body with respect to the front edge of said body for retracting said brake pads away from said disc.

2. The retaining plate of claim 1 further comprising a locking section formed between said pair of depressing sections.

3. The retaining plate of claim 2 wherein said locking section extends outward from the rear edge of said body in the same plane as said plate-shaped body and has a pair of downwardly extending flanges.

4. The retaining plate of claims 1 or 2 wherein said depressing sections are bent downwardly from the rear edge of said body.

5. The retaining plate of claim 4 further comprising a pair of flanges extending downwardly from the front edge of said body.

* * * * *